United States Patent [19]

Inaba et al.

[11] Patent Number: 5,283,018
[45] Date of Patent: Feb. 1, 1994

[54] PRODUCT ACCEPTANCE/REJECTION JUDGEMENT METHOD FOR AN INJECTION MOLDING MACHINE

[75] Inventors: Yoshiharu Inaba, Kawasaki; Masao Kamiguchi; Noriaki Neko, both of Oshino, all of Japan

[73] Assignee: Fanuc Ltd., Minamitsuru, Japan

[21] Appl. No.: 828,988

[22] PCT Filed: May 28, 1991

[86] PCT No.: PCT/JP91/00715

§ 371 Date: Feb. 3, 1992

§ 102(e) Date: Feb. 3, 1992

[87] PCT Pub. No.: WO91/18729

PCT Pub. Date: Dec. 12, 1991

[30] Foreign Application Priority Data

Jun. 1, 1990 [JP] Japan .................. 2-141607

[51] Int. Cl.[5] .............................................. B29C 45/76
[52] U.S. Cl. ......................... 264/40.1; 264/328.1; 425/135; 425/136; 425/143
[58] Field of Search ........... 264/40.1, 40.3, 40.6, 264/328.1; 425/73, 135, 136, 143, 144, 210

[56] References Cited

U.S. PATENT DOCUMENTS

| | | | |
|---|---|---|---|
| 4,364,893 | 12/1982 | Waters | 425/73 |
| 4,725,389 | 2/1988 | Hahn et al. | 264/53 |
| 4,913,638 | 4/1990 | Buja | 264/40.5 |
| 5,086,824 | 2/1992 | Tsuda et al. | 164/4.1 |
| 5,108,672 | 4/1992 | Sasaki et al. | 264/40.5 |

FOREIGN PATENT DOCUMENTS

| | | | |
|---|---|---|---|
| 3211728 | 10/1982 | Fed. Rep. of Germany | 264/40.1 |
| 63-4925 | 1/1988 | Japan | |
| 63-185611 | 8/1988 | Japan | |

Primary Examiner—Jill L. Heitbrink
Attorney, Agent, or Firm—Staas & Halsey

[57] ABSTRACT

A product acceptance/rejection judgment method which always ensures accurate judgment whether a product is acceptable or not even when an injection molding machine is operated in different operating environments is implemented by a processor (22) of a numerically controlled device (20). When the processor determines that it should perform, in addition to a normal product acceptance/rejection judgment based on molding process parameters, an auxiliary product acceptance/rejection judgment based on at least one operating parameter which directly indicates an injection molding machine operating environment characteristic involved in the acceptance/rejection judgment of the product, the processor reads output data from an A-D converter (11, 12 or 13) which data corresponds to the actual value of at least one operating parameter detected by an appropriate die temperature sensor (8), open air temperature sensor (9) or a wind velocity sensor (10). If an actual value of any one of the operating parameters deviates from the tolerance limit, and the processor determines that a molding failure may have occurred, the processor issues a failure signal. If all actual values of at least one operating parameter are within the tolerance limits, then the normal product acceptance/rejection judgment process is further implemented.

7 Claims, 3 Drawing Sheets

PRODUCT ACCEPTANCE/REJECTION JUDGEMENT METHOD FOR AN INJECTION MOLDING MACHINE

BACKGROUND OF THE INVENTION

1. Field of the Invention

The present invention relates to a product acceptance/rejection judgment method for an injection molding machine, and more particularly, to a product acceptance/rejection judgment method which makes it possible to accurately determine whether a product is acceptable or not at all times even when an injection molding machine is operated in various operating environments.

2. Description of the Related Art

It is known that a product sample taken out from a group of products that have been mass-produced by repeating a molding cycle is visually compared with a non-defective sample to determine whether it is acceptable or not. However, such visual inspection cannot ensure accurate judgment criteria, and also the non-defective sample changes on standing. For this reason, the product acceptance/rejection judgment based on visual inspection presents such problems as low reliability. Conventionally, therefore, it is judged whether or not the actual values of molding process parameters (cushion amount, injection time, metering time, metering completion point, injection pressure peak value, screw position where the injection speed control mode is switched to the injection pressure control mode, etc.) which are all related to the acceptance/rejection of a product are within tolerance limits during a molding cycle, and the product is determined to be defective if any of its molding process parameters is found to deviate from the tolerance limits.

However, when the injection molding machine is operated in different operating environments, there are some cases where defective units result even when molding cycles are implemented under molding conditions that should produce non-defective units, with all molding process parameters being within tolerance limits. This means that accurate product acceptance/rejection judgment may not be performed according to the aforementioned conventional method wherein the product acceptance/rejection judgment is made based on molding process parameters.

The major reason for this is considered that the conventional method does not adequately take into account operating environment changes involved in determining whether a product is acceptable or not. If the operating environments of an injection molding machine change, corresponding molding process parameter values change accordingly, therefore, the operating environment changes are indirectly considered in the conventional acceptance/rejection judgment. For instance, if a window of a factory which is usually closed is opened to let wind blow onto a die installed on an injection molding machine, causing the die to be cooled, then the injection time increases. And if the injection time exceeds its tolerance limit, then the product molded at that time is determined to be defective. However, it takes time for a molding process parameter value to deviate from its tolerance limit after a defective unit results from an operating environment change. During that time, therefore, accurate product acceptance/rejection judgment cannot be implemented, causing the occurrence of defective units.

SUMMARY OF THE INVENTION

An object of the present invention is to provide a product acceptance/rejection judgment method which makes it possible to always make accurate judgment whether a unit is defective or not even when an injection molding machine is operated in different operating environments.

To fulfill the foregoing object, according to the present invention, the values of operating parameters which directly indicate the injection molding machine operating environments involved in judging the quality of a product are detected, and if the detected operating parameter values deviate from tolerance limits, then it is judged that a molding failure has taken place.

As described above, according to the present invention, it is judged that a molding failure has occurred if the detected values of the operating parameters which directly indicate the injection molding machine operating environments involved in judging the quality of products deviate from tolerance limits, therefore, if any operating environment change that can lead to a molding failure takes place, then it is immediately determined that a molding failure has occurred. Consequently, even when an injection molding machine is operated in diverse operating environments, accurate product acceptance/rejection judgment can be always performed, helping carry out good quality control of moldings.

DESCRIPTION OF THE PREFERRED EMBODIMENT

Figure 1:
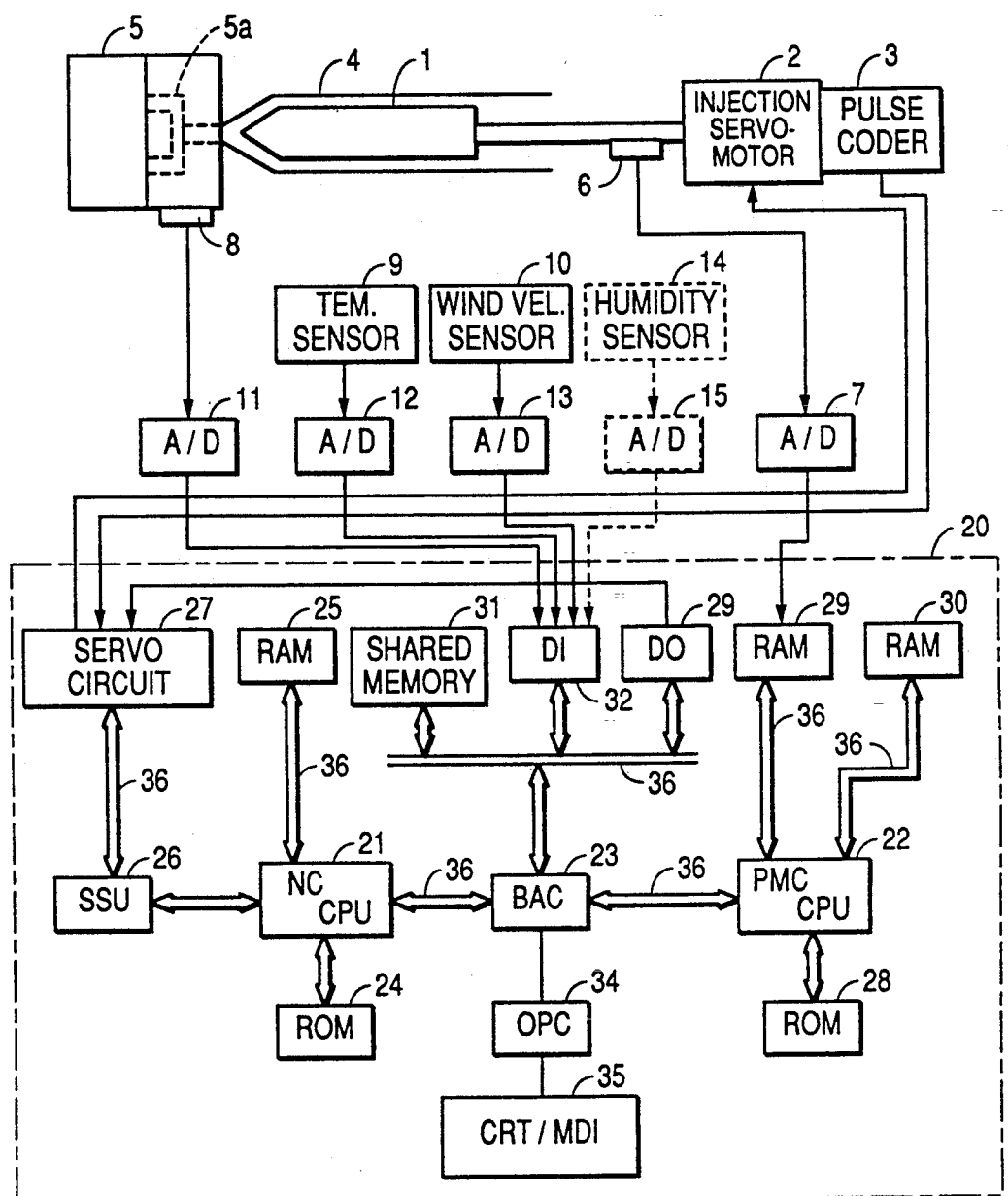
FIG. 1 is a block diagram showing the major section of an injection molding machine for implementing the product acceptance/rejection judgment method according to an embodiment of the present invention.

The injection molding machine for carrying out the product acceptance/rejection judgment method according to the embodiment of the present invention is provided with various mechanism such as an injection mechanism, clamping mechanism, and ejector. Referring to FIG. 1, the injection mechanism is equipped with a screw 1 installed in a heating cylinder 4, an injection servomotor 2 for driving the screw in the axial direction, and a servomotor (not shown) for rotating the screw 1, and it is designed to inject a molding material (resin) which has been plasticized and kneaded in the heating cylinder 4 into a molding cavity 5a formed in a die 5 by moving the screw 1 in the axial direction. A pulse coder 3 for detecting a motor rotational position (a position on the screw axis) is installed on the injection servomotor 2, and a pressure sensor 6 which comprises, for example, a load cell, for detecting a resin pressure (an axial reaction force of molten resin applied to the screw) is mounted on the screw 1. Also, a die temperature sensor 8 for detecting the die surface temperature is mounted on the external surface of the die 5. Further, the injection molding machine has an open air temperature sensor 9 for detecting the temperature of the surrounding air and a wind velocity sensor 10 for detecting the velocity of the wind around the injection molding machine. A reference numeral 14 denotes a numidity sensor which is mounted on the injection molding machine as necessary to detect the humidity around the injection molding machine.

A reference numeral 20 denotes a numerically controlled device (NC device) 20 for driving and controlling the diverse mechanisms of the injection molding machine. The NC device 20 is equipped with a microprocessor 21 for numerical control (NC CPU) and a microprocessor 22 for a programmable machine controller (PMC CPU) to provide a numerical control function and a sequence control function.

More specifically, to the NC CPU 21 are connected a read-only memory (ROM) 24 which stores a control program for controlling an entire injection molding machine, a random-access memory (RAM) 25 which is used for temporarily storing data or the like, and a servo circuit (only the servo circuit related to the injection motor 2 is indicated at 27) for driving and controlling the servomotors of the individual axes via a servo interface (SSU) 26. The servo circuit 27 is connected to the injection motor 2 and the pulse coder 3. To the PMC CPU 22 are connected a ROM 28 wherein a sequence program or the like for controlling the sequential operation of the injection molding machine is stored, a RAM 29 which is connected to the pressure sensor 6 via an A-D converter 7 and which stores pressure data that is received from the A-D converter 7 and that corresponds to a resin pressure detected by the pressure sensor 6, and a RAM 30 used for temporarily storing data such as a calculation result given by the PMC CPU 22.

The NC device 20 is further equipped with a bus arbiter controller (BAC) 23 for bus control. To the BAC 23 are connected buses 36 of the CPUs 21 and 22, a shared memory 31, an input circuit (DI) 32, and an output circuit (DO) 33. The shared memory 31 stores an NC program, molding conditions, setting values, etc., and comprises a nonvolatile RAM. To each of the input circuit 32 and the output circuit 33 are connected diverse sensors and actuators (none of the actuators are shown) installed in the diverse mechanisms of the injection molding machine, including the die temperature sensor 8, the open air temperature sensor 9, and a wind velocity sensor 10, and servo circuit 27. The sensors 8, 9 and 10 are connected to the input circuit 32 via the A-D converters 11, 12 and 13 for converting analog sensor outputs to digital signals. A reference numeral 15 indicates an A-D converter matched to the humidity sensor 14, and a reference numeral 35 denotes a manual data input device with a CRT display unit (CRT/MDI) connected to the BAC 23 via an operator panel controller 34.

As discussed in detail later, in the present embodiment, auxiliary product acceptance/rejection judgment based on at least one operating parameter (die surface temperature, the open air temperature and wind velocity around the injection molding machine, etc.) which directly indicates the operating environment of the injection molding machine which environment is involved in judging the quality of products is made in addition to the conventional product acceptance/rejection judgment based on various molding process parameters (cushion amount, injection time, metering time, metering completion position, injection pressure peak value, screw position where the injection speed control mode is switched to the injection pressure control, etc.). For this purpose, the tolerance limits (upper and lower limit values) of the individual operating parameters indicating the operating environments that ensure molding of non-defective units are predetermined by carrying out experiments or the like before starting mass production of moldings, and these values and flag information that indicates the type of an operating parameter to be used for the auxiliary product acceptance/rejection judgment are manually set in the NC device 20.

In relation to the above, the CRT/MDI 35 is equipped with a CRT screen (not illustrated) for displaying parameter setting information used to set the type of operating parameter for making the auxiliary product acceptance/rejection judgment and to set the upper and lower limit values of the operating parameters, and a keyboard having operating keys for manually entering alphanumeric strings for setting the upper and lower limit values of the operating parameters and the flag information. Also, the shared RAM 31 has a memory area for storing the upper and lower limit values of the operating parameters and the flag information. In the following description, symbols TOH and TOL denote the upper end lower limit values of the open air temperature, TDH and TDL the upper and lower limit values of the die surface temperature, and WVH and WVL the upper and lower limit values of the wind velocity. Further, symbols FO, FD and FV represent the flags for the open air temperature, die surface temperature and wind velocity, respectively.

The following describes the operation of the injection molding machine which is configured as mentioned above.

First, an operator depresses the key for selecting the parameter setting screen of the CRT/MDI 35. In response to the key operation, the parameter setting screen (not illustrated) is shown on the CRT screen under the control of the PMC CPU 22. Then, the operator normally enters by hand successively, through the keyboard of the CRT/MDI 35, at least one type of operating parameter and the upper and lower limit values of at least one operating parameter related to one particular type of product, referring to the setting screen. The PMC CPU 22 stores the manually entered upper and lower limit values of the operating parameter in the shared RAM 31, and sets the value of a corresponding flag memory of the shared RAM 31 to "1." As necessary, the same operation is repeated according to the same procedure for another type of molding.

Figure 2:
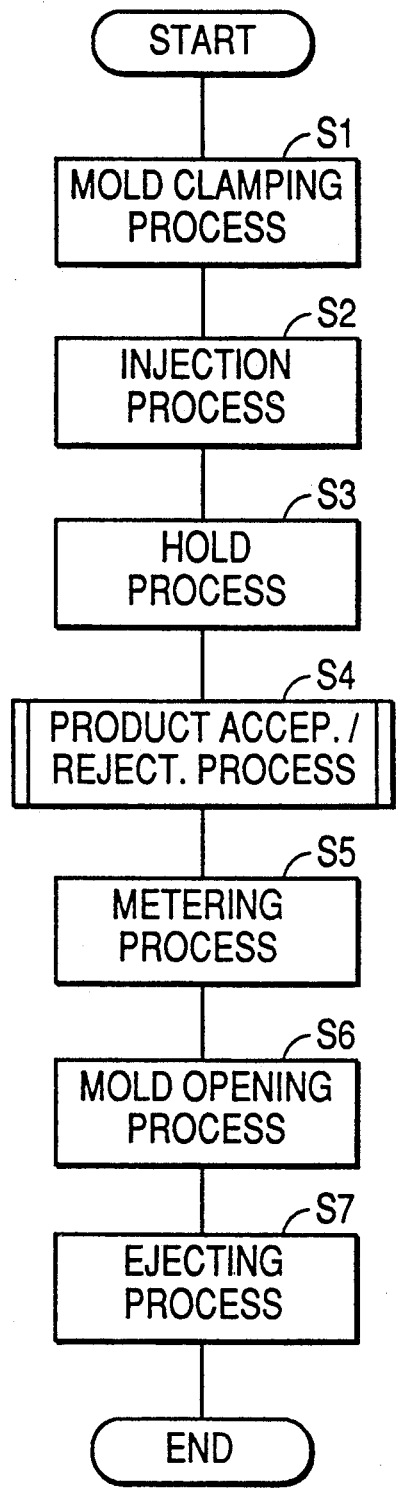
FIG. 2 is a flowchart showing a molding cycle carried out by the injection molding machine of FIG. 1.

When the operation of the injection molding machine is started, the NC device 20 controls the injection molding machine as conventionally known in accordance with the NC program stored in the shared RAM 31, the sequence program stored in the ROM 28, and the molding conditions preset in the shared RAM 31. More specifically, the servo circuit 27 receives a distributing pulse from the NC CPU 21 via the servo interface 26 and also receives a feedback pulse from the pulse coder 3, determines a speed command by D/A-converting a deviation of an actual position of the injection motor 2 from a command position, and determines the actual speed by F/V-converting an output of the pulse coder. Further, the servo circuit 27 supplies a driving current to the injection motor 2 according to a result of the comparison between the speed command and the actual speed and a torque limit value supplied by the PMC CPU 22 via the output circuit 33, thereby controlling the output torque of the injection motor. After that, the foregoing injection speed control mode is switched to the conventional well-known injection pressure control mode. Further, the mechanisms other than the injection mechanism are controlled in a well-known mode, and in this way, the conventional well-known molding cycle is repeatedly implemented. In each molding cycle, the PMC CPU 22 sequentially executes a series of processes of clamping, injecting, holding, making product acceptance/rejection judgement, metering, die opening, and ejecting (steps S1 through S7 in FIG. 2).

Figure 3:
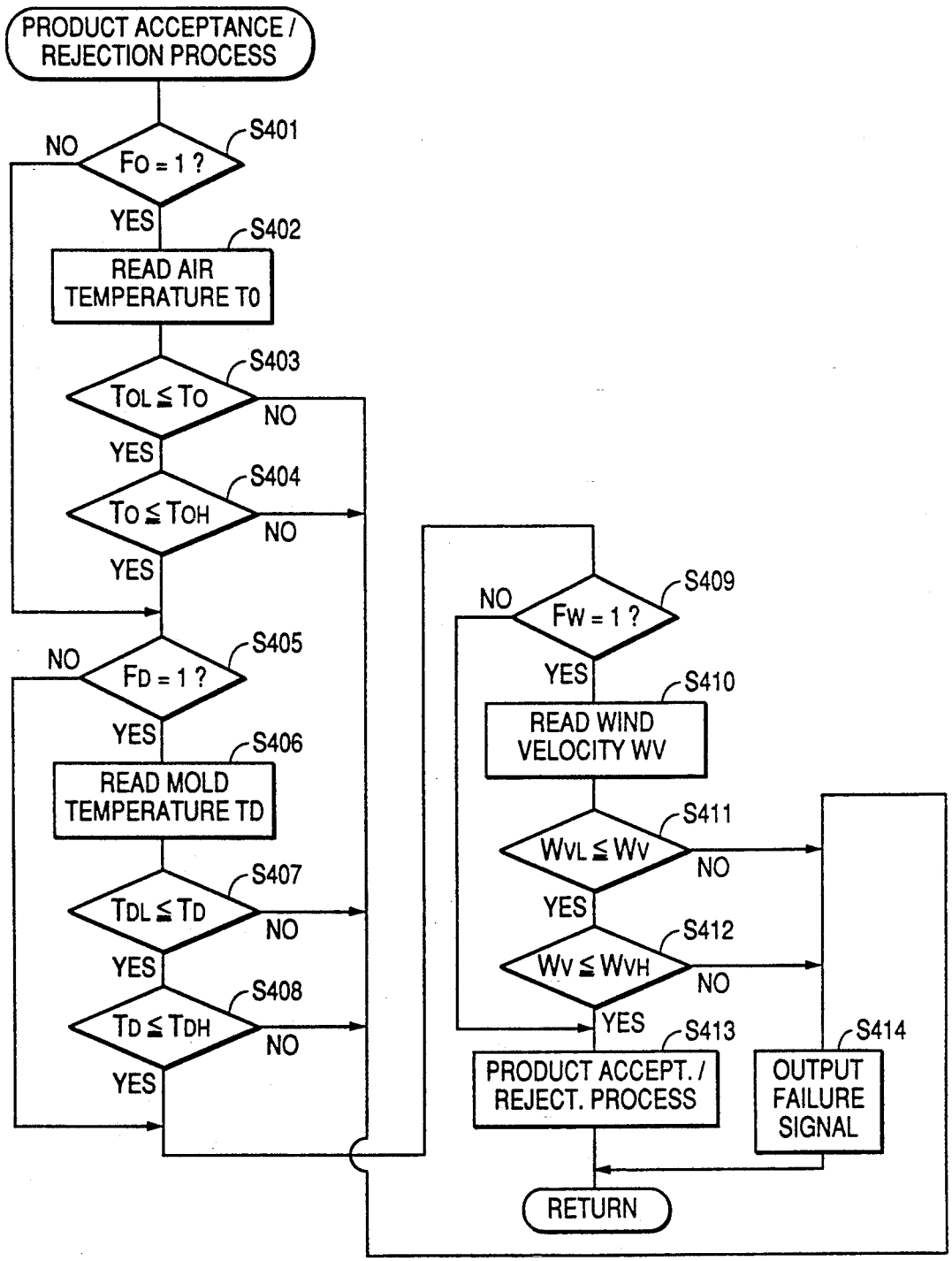
FIG. 3 is a flowchart showing a product acceptance/rejection judgment procedure carried out by a numerically controlled device shown in FIG. 1.

Referring to FIG. 3, the process of making product acceptance/rejection judgment is now explained in detail.

When the process of making product acceptance/rejection judgment is begun, the PMC CPU 22 first determines whether or not the flag F0 is "1" which indicates that the auxiliary product acceptance/rejection judgment based on the open air temperature should be performed (step S401). If the judgment result in the step S401 is negative, then the CPU 22 determines whether or not the flag FD is "1" which indicates that the auxiliary product acceptance/rejection judgment based on the die surface temperature should be performed (step S405). If the judgment result of the step S405 is negative, then the CPU 22 further determines whether or not the flag FW is "1" which indicates that the auxiliary product acceptance/rejection judgment based on the wind velocity should be performed (step S409). If this judgment result is negative, and therefore all the results in the step S401, S405 and S409 are negative, then the CPU 22 executes the normal product acceptance/rejection judgment process in a step S413. In the normal product acceptance/rejection judgment process, it is determined whether or not the detected values of various molding process parameters (cushion amount, injection time, metering time, metering completion point, injection pressure peak value, screw position where the injection speed control mode is switched to the injection pressure control mode, etc.) are within the tolerance limits. If it is found that all molding process parameter values are within the tolerance limits, and therefore judged that there is no possibility of any molding failure having taken place, then a chute (not illustrated) which is provided midway on a product carrying path (not shown) located, for example, at the bottom of the ejector, and which separates non-defectives from defectives, is switched to the non-defectives carrying path side under the control of the NC device 20. In this way, the product obtained from that molding cycle is carried to a non-defectives storing space. On the other hand, if it is found that any of the moulding process parameter values deviates from its tolerance limit, and therefore there is a possibility of a molding failure having taken place, then the CPU 22 issues a failure signal. In response to the failure signal, the chute is switched to the defectives carrying path side under the control of the NC device 20 to carry the product to a defectives storing space. Then, the CPU 22 begins the metering process (step S5 of FIG. 2) for the subsequent product.

If it is determined that the value of the flag F0 is "1" during the step S401 in the auxiliary product acceptance/rejection judgment for the molding cycle, then the PMC CPU 22 reads, via the input circuit 32 and the BAC 23, the output data from the A-D converter 12 which data corresponds to an analog output of the open air temperature sensor 9 and indicates the actual open air temperature T0 (step 402), and determines whether the open air temperature T0 exceeds the lower limit value T0L or not in order to perform the auxiliary product acceptance/rejection judgment based on the open air temperature for this molding cycle (step S403). If the judgment result in the step S403 is positive, then the CPU 22 determines whether the open air temperature T0 is below the upper limit value T0H or not (step S404). If the judgment result of the step S403 or S404 is negative, which means that the open air temperature deviates from the tolerance limits, there is a possibility of a molding failure having occurred, therefore, a failure signal is sent out (step S414), and the process of FIG. 3 for that molding cycle is terminated. When the failure signal is issued, the product obtained from the molding cycle is carried to the defectives storing space as in the case where the failure signal is generated in the normal product acceptance/rejection judgment process.

On the other hand, if both judgment results of the steps S403 and S404 are positive, which means that the open air temperature is within the tolerance limits, then the PMC CPU 22 determines whether the value of the flag FD is "1" or not (step S405). If the judgment result of the step S405 is negative, then the program goes to the foregoing step S409. If the judgment result of the step S405 is positive, then the CPU 22 reads, via the input circuit 32 and the BAC 23, the output data from the A-D converter 11 which data corresponds to an analog output of the die temperature sensor 8 and indicates the actual die surface temperature TD (step S406), and determines whether the die surface temperature TD exceeds the lower limit value TDL or not (step S407) in order to perform the auxiliary product acceptance/rejection judgment based on the die surface temperature. If the judgment result in the step S407 is positive, then the CPU 22 determines whether the die surface temperature TD is below the upper limit value TDH or not (step S408). If the judgment result of the step S407 or S408 is negative, which means that the die surface temperature deviates from the tolerance limits, there is a possibility of a molding failure having occurred, and therefore, a failure signal is sent out (step S414), then the process of FIG. 3 for the molding cycle is terminated.

If both judgment results of the step S407 and S408 are positive, which means that the die surface temperature is within the tolerance limits, then the CPU 22 determines whether the value of the flag FW is "1" or not (step S409). If the judgment result of the step S409 is negative, then the program goes to the step S413. If the judgment result of the step S409 is positive, then the CPU 22 reads, via the input circuit 32 and the BAC 23, the output data from the A-D converter 13 which data corresponds to an analog output of the wind velocity sensor 10 and indicates the actual wind velocity WV (step S410), and determines whether the wind velocity WV is higher than the lower limit value WVL or not in order to perform the auxiliary product acceptance/rejection judgment based on the wind velocity (step S411). If the judgment result in the step S411 is positive, then the CPU 22 determines whether the wind velocity WV is below the upper limit value WVH or not (step S412). If the judgment result of the step S411 or S412 is negative, which means that the wind velocity deviates from the tolerance limits, there is a possibility of a molding failure having occurred, and therefore, a failure signal is sent out (step S414), then the process of FIG. 3 for the molding cycle is terminated.

If both judgement results of the steps S411 and S412 are positive, which means that the wind velocity is within the tolerance limits, then it is determined that all the open air temperature, die surface temperature, and the wind velocity are within the tolerance limits. In this case, in addition to the auxiliary product acceptance/rejection judgment processes which are implemented in the aforementioned procedures, the normal product acceptance/rejection judgement process is carried out (step S413). Then, in accordance with the normal product acceptance/rejection judgement result, the product produced from that molding cycle is carried to the non-defectives storing space or the defectives storing space as described above.

The present invention is not limited to the foregoing embodiment but is available in diverse variations. For instance, if the injection molding machine is operated in an operating environment where humidity can significantly change, an auxiliary product acceptance/rejection judgment process based on the humidity around the injection molding machine which process is similar to those described above may be carried out, using a humidity sensor 14 and an A-D converter 15 shown with broken lines in FIG. 1.

What is claimed is:

1. A product acceptance/rejection judgment method for an injection molding machine, comprising the steps of:
    (a) detecting at least one operating parameter value which directly indicates an ambient property of an injection molding machine operating environment involved in determining whether a product is acceptable or not; and
    (b) determining that a molding failure has occurred when the at least one operating parameter value detected in step (a) deviates from tolerance limits thereof.

2. The product acceptance/rejection judgment method according to claim 1, wherein the operating parameter value indicates one of a temperature around the injection molding machine, a wind velocity around the injection molding machine, and a humidity around the injection molding machine.

3. The product acceptance/rejection judgment method according to claim 1, further comprising the step of (c) selecting at least one of a plurality of operating parameters in advance for the at least one operating parameter value to be detected in step (a).

4. The product acceptance/rejection judgment method according to claim 1,
    wherein the at least one operating parameter value includes values of a plurality of operating parameters detected in step (a), and
    wherein it is determined in step (b) that the molding failure has occurred if one of the values of the operating parameters detected in step (a) deviates from a tolerance limit thereof.

5. The product acceptance/rejection judgment method according to claim 4,
    further comprising the step of (c) selecting at least two of the operating parameters in advance, and
    wherein at least one operating parameter value detected in step (a) includes values of the at least two operating parameters selected in advance in step (c).

6. A product acceptance/rejection judgment method for an injection molding machine, comprising the steps of:
    (a) selecting for detection at least two operating parameters from among surface temperature of a die of the injection molding machine, ambient temperature around the injection molding machine, wind velocity around the injection molding machine, and humidity around the injection molding machine;
    (b) detecting during operation of the injection molding machine values of the at least two operating parameters selected in step (a); and
    (c) determining that a molding failure has occurred when the values of any of the at least two operating parameters detected in step (b) deviate from tolerance limits thereof.

7. A product acceptance/rejection judgment method for an injection molding machine, comprising:
    (a) detecting values of a plurality of operating parameters, including at least two of a surface temperature of a die of the injection molding machine, a temperature around the injection molding machine, a wind velocity around the injection molding machine, and a humidity around the injection molding machine; and
    (b) determining that a molding failure has occurred if any of the values detected in step (a) deviate from a tolerance limit thereof.

* * * * *